May 24, 1966   J. F. F. C. C. SCHELLEKENS   3,253,147
DOSEMETER FOR MEASURING IONIZING RADIATION
Filed Aug. 20, 1963

INVENTOR.
JEAN F. F.C.C. SCHELLEKENS
BY
AGENT

United States Patent Office 3,253,147
Patented May 24, 1966

3,253,147
DOSEMETER FOR MEASURING IONIZING RADIATION
Jean Frantz Felix Camille Cesar Schellekens, Hamme-sur-Durme, Belgium, assignor to Manufacture Belge de Lampes et de Materiel Electronique S.A., Brussels, Belgium
Filed Aug. 20, 1963, Ser. No. 303,282
Claims priority, application Belgium, Sept. 10, 1962, 497,305
5 Claims. (Cl. 250—83)

It is known to measure ionizing radiation, for example X-rays and gamma-rays, with the aid of dosemeters which measure the irradiation dose. Some dosemeters include a reading instrument, but in other dosemeters the dosage must be determined with the aid of a separate measuring device. Weekly or after a longer period of use such a measurement is made.

In order to protect the dosemeter against mechanical damage it is arranged in an envelope which also intercepts light rays. In indicating dosemeters the sensitive measuring device is also arranged in the envelope, and this is hermetically closed to prevent the substances which adversely affect the operation, especially water vapour, from penetrating.

When a separate measuring device is required, the envelope is removed to enable measurements to be made. A certain kind of dosemeters, which comprise a length of film sensitive to radiation, are used only once, the envelope being expended together with the film.

The present invention relates to dosemeters provided with an envelope from which they are removed after use. A new dosemeter may then be inserted in the envelope. It is important for the aperture through which a dosemeter can be inserted or taken away to be furnished with a readily removable closure member which provides a satisfactory seal. According to the invention the closure member is held in the envelope by a clamping connection and protected against removal by a thin-walled closure plate sealing a duct used for disconnecting the clamping connection. Clamping connections are known which after having been rendered operative may be rendered inoperative with the aid of suitable equipment. In a practical embodiment of the invention a closure member is provided with tipping blocks which are moved from a position in which they lock the closure member against displacement to another position in which the locking is undone, with the aid of a movable sliding member.

The said embodiment will be explained more fully hereinafter with reference to the accompanying drawing.

Figure 1:
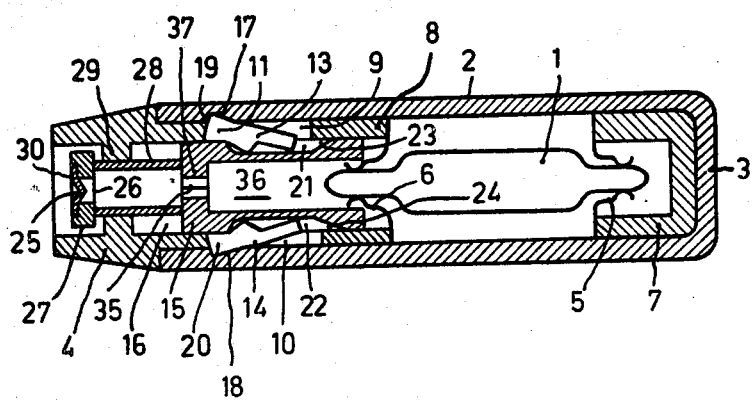
Figure 2:

FIG. 1 shows a sectional view of a device according to the invention and FIG. 2 is a diagrammatical view of a tool for use in connection with the device shown in FIG. 1.

A dosemeter 1 is arranged in an envelope made, for example, of aluminum or another material which only slightly absorbs X-rays and gamma-rays and is impervious to visible light. A cylindrical aluminum envelope the closed surface 2 and the base 3 of which form an integral unit, can readily be manufactured. At the end opposite the base the cylinder is open and provided with a closure member 4. The dosemeter 1 is clamped at both ends by springs 5 and 6. A set of springs 5 is secured to a dished insertion piece 7 pressed into the sleeve 2 so as to engage the base 3. The other set of springs 6 is secured to the inner end 8 of the closure member 4. The portion of the closure member situated within the envelope comprises along the circumference two recesses 9 and 10 which each contain a tipping block 11 and 12, respectively. The blocks are adapted to pivot, substantially at their centres, about pins 13 and 14 respectively secured to the closure member 4 and are shaped in a special form. In the position shown in FIGURE 1, one end of each block is enclosed between the wall 2 of the envelope and a slide member 15 disposed in a bore 16 of the closure member 4. The wall 2 is provided with notches 17 and 18 into which projections 19 and 20 of the tipping blocks 11 and 12 protrude so as to prevent the closure member 4 from being removed from the sleeve 2. To remove the projections from the notches the slide member 15 must be displaced to the left. Along its circumference the slide member 15 has two recesses 21 and 22 with inclined edges. When the slide member 15 is shifted, edges 23 and 24 pass under the tipping blocks so that the latter are pivoted about their pins. This pivoting movement is possible due to the fact that in the meantime the slide member 15 has been displaced through a distance such that the projections 19 and 20 are no longer enclosed in the recesses 17 and 18 of the sleeve 2. The closure member 4 can then be removed.

The displacement of the slide member 15 requires a tool with which two operations are to be performed. To reach the slide member a thin wall 25 must be pierced. This wall closes one end 26 of a duct in a thrust member 27 provided with a cylindrical guiding tube 28 with which the number can move in an aperture in a partition 29 within the closure member 4. This partition 29 shuts off the bore 16. The thin wall 25 may be a separate plate which fits within an annular groove 30 in the thrust member 27.

The tool to be used to displace the slide member 15 may be a thin pin 31 (FIGURE 2) provided with a knob 32 at one end. At the other end is a thickened portion 33 of square cross-section which tapers to a point 34. The plate 25 is pierced with the point and the pin is then inserted until the thickened portion 33 of square cross-section is passed through an aperture 35 in the slide member 15. The slide member 15 is provided with a bore 36 and the aperture 35 is made in a transverse wall 37 bounding the bore 36. The aperture 35 in the wall 37 is square and gives passage to the thickened portion 33 of the pin 31 if the two square cross-sections of this thickened portion and the aperture 35 coincide. By rotating the pin through a small angle and then retracting it the slide member 15 is carried along and the clamping connection of the tipping blocks 11 and 12 with the sleeve 2 is disconnected. The closure member 4 can now be removed.

In closing the envelope the closure member 4 is first introduced into the sleeve 2, after which the thrust member 27 is pressed in so that the slide member 15 moves to the right and establishes the clamping connection.

The invention is intended particularly for use in dosemeters which are based on measurements of the intensity of light radiated, on heating, by a thermo-luminescent material which has previously been irradiated by the radiation to be measured. A layer of thermo-luminescent material is applied to a support, the shape of the support determining whether the dosemeter takes the form of a rod or a box. The embodiment described has the form of a rod, however, the invention may also be used for dosemeters approaching the shape of a box.

What is claimed is:
1. A device for measuring ionizing radiation comprising an envelope permeable to the ionizing radiation and impermeable to visible radiation, an element positioned within said envelope responsive to the ionizing radiation, a removable member closing a portion of said envelope to permit removal of the ionizing radiation responsive element, and means to secure said removable member in said envelope comprising a member slideable within the envelope and a pivotable clamping member within the envelope which engages the slideable member and the inner wall of the envelope.

2. A device for measuring ionizing radiation comprising an envelope permeable to the ionizing radiation and impermeable to visible radiation, an element positioned within said envelope responsive to the ionizing radiation, a tubular member closed at one end for closing a portion of said envelope and permitting removal of the ionizing radiation responsive element, and means to secure said tubular member in said envelope comprising a slideable member within said envelope engaging said tubular member and a pivotable clamping member within the envelope which engages the slideable member and the inner wall of the envelope.

3. A device for measuring ionizing radiation comprising an envelope permeable to the ionizing radiation and impermeable to visible radiation, an element positioned within said envelope responsive to the ionizing radiation, a tubular closure member having a wall closing one end thereof for closing a portion of said envelope and permitting removal of the ionizing radiation responsive element, and means to secure said tubular closure member in said envelope comprising a slideable member within said envelope engaging said tubular closure member and a pivotable clamping member within the envelope which engages the slideable member and the inner wall of the envelope, said slideable member being adapted to receive a member which pierces the closing wall of said tubular member for moving said slideable member and release the clamping member from engagement with the inner wall of the envelope.

4. A device for measuring ionizing radiation comprising an envelope permeable to the ionizing radiation and impermeable to visible radiation, an element positioned within said envelope responsive to the ionizing radiation, a tubular closure member having a transverse partition closing a portion of said envelope and permitting removal of the ionizing radiation responsive element, a tubular thrust member extending through said partition closed at one end by a transverse wall, and means to secure said closure member in said envelope comprising a tubular member slideable within the envelope and a pivotable clamping member within the envelope which engages the slideable member and the inner wall of the envelope.

5. A device for measuring ionizing radiation comprising an envelope permeable to the ionizing radiation and impermeable to visible radiation, an element positioned within said envelope responsive to the ionizing radiation, a tubular closure member having a transverse partition closing a portion of said envelope and permitting removal of the ionizing radiation responsive element, a tubular thrust member extending through said partition, a transverse wall secured in an annular groove in the thrust member, and means to secure said closure member in said envelope comprising a tubular member slideable within the envelope and pivotable clamping members within the envelope which engage the slideable member and fit into recesses in the inner wall of the envelope.

References Cited by the Examiner

UNITED STATES PATENTS 2,881,326   4/1959   Lynch _____ 250—83.3

RALPH G. NILSON, *Primary Examiner.*

ARCHIE R. BORCHELT, *Examiner.*